Dec. 9, 1969  SEIUEMON INABA ET AL  3,483,406
AXIAL AIR GAP DISC ROTOR MULTISTAGE STEPPING MOTOR
Filed Jan. 19, 1968  4 Sheets-Sheet 2

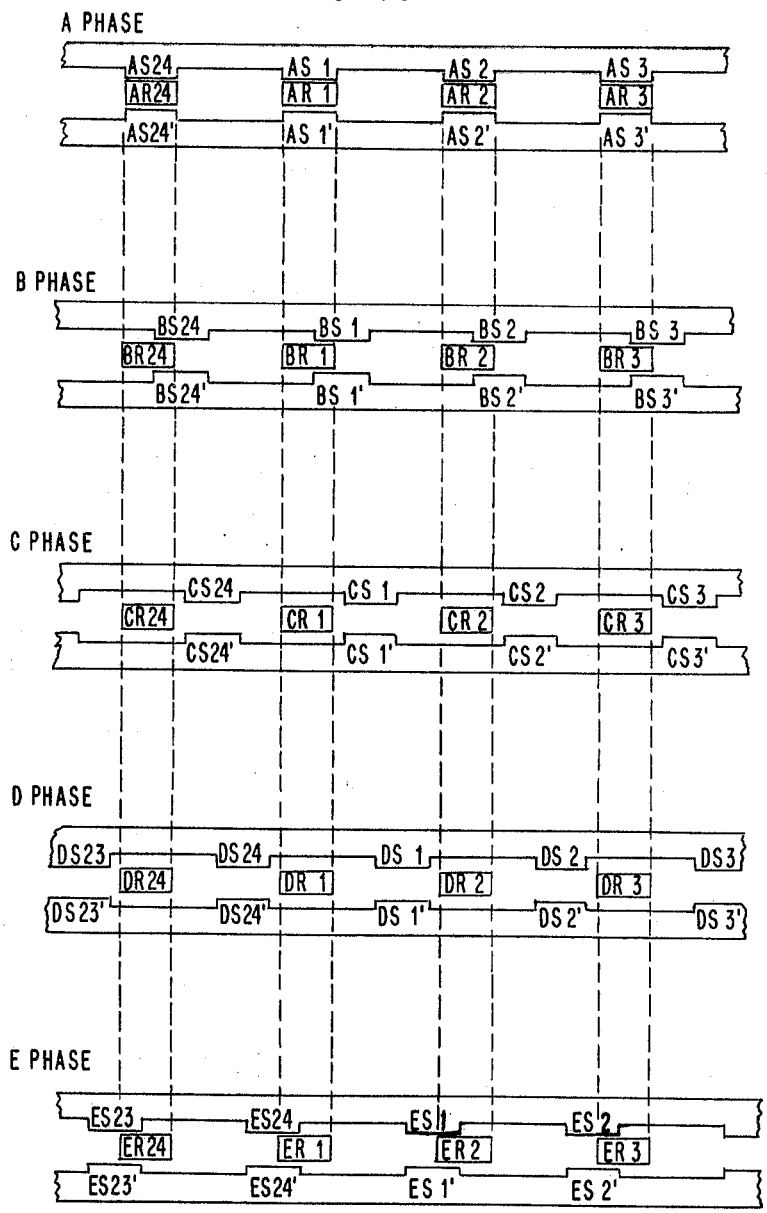

United States Patent Office 3,483,406
Patented Dec. 9, 1969

3,483,406
AXIAL AIR GAP DISC ROTOR MULTISTAGE
STEPPING MOTOR
Seiuemon Inaba, Kawasaki-shi, Toshio Kojima, Yamato-shi, and Yoichi Amemiya, Kawasaki-shi, Japan, assignors to Fujitsu Limited, Kawasaki, Japan, a corporation of Japan
Filed Jan. 19, 1968, Ser. No. 699,081
Claims priority, application Japan, Jan. 29, 1967, 42/7,624
Int. Cl. H02k 37/00
U.S. Cl. 310—49         13 Claims

ABSTRACT OF THE DISCLOSURE

Each of a plurality of stages of a step motor comprises a disc rotor core coaxially positioned around and affixed to a separate rotor shaft and having a plurality of radially extending magnet poles formed therein. Each stage further comprises a pair of annular stator cores coaxially positioned around the rotor shaft in spaced substantially parallel axial relation one on each side of the rotor core and each having a plurality of magnet poles formed therein on its surface facing the other and a stator core excitation winding coaxially positioned around the rotor core in the space between the pair of stator cores. A non-magnetic annular spacer is coaxially positioned around each rotor shaft between each rotor core and each of the corresponding pair of stator cores for maintaining a constant distance between the rotor core and the stator cores. The stator cores of the stages are positioned with a small gap between the stator cores of each stage and the stator cores of the adjacent stages.

DESCRIPTION OF THE INVENTION

Our invention relates to a polyphase step motor. More particularly, our invention relates to a polyphase step motor with reduced leakage flux.

Although the fundamental principle of the polyphase step motor is well established, there is considerable room for improvement in this type of motor, especially in its structural details.

The principal object of the present invention is to provide a new and improved polyphase step motor.

An object of the present invention is to provide a polyphase step motor with reduced leakage flux in the magnetic circuitry, and therefore high efficiency in operation.

An object of the present invention is to provide a polyphase step motor with reduced leakage flux in the magnetic circuitry and reduced rotor inertia, and therefore high efficiency in operation.

An object of the present invention is to provide a polyphase step motor of simple structure.

An object of the present invention is to provide a polyphase step motor which may be readily assembled and disassembled.

An object of the present invention is to provide a polyphase step motor which functions with efficiency, effectiveness and reliability.

An object of the present invention is to provide a polyphase step motor which may be assembled by assembling each stage independently from the others and by then affixing the stages to each other.

An object of the present invention is to provide a polyphase step motor which may be assembled by affixing a number of stages to each other in axial direction, the number of stages being equal to the number of phases.

An object of the present invention is to provide a polyphase step motor which may be assembled and disassembled without special adjustment by unskilled personnel.

Another object of the present invention is to provide a polyphase step motor in which a small gap is provided between the stator cores of one phase and the stator cores of the adjacent phases.

In accordance with the present invention, a step motor has a plurality of stages. Each of the stages comprises a rotor shaft. A rotor core is coaxially positioned around and affixed to the rotor shaft and has a plurality of radially extending magnet poles formed therein. A pair of annular stator cores are coaxially positioned around the rotor shaft in spaced substantially parallel axial relation one on each side of the rotor core and each has a plurality of magnet poles formed therein on its surface facing the other. The magnet poles of the rotor core and the stator cores correspond to each other in number. A stator core excitation winding is coaxially positioned around the rotor core in the space between the pair of stator cores. The stator cores of the stages are positioned with a small gap between the stator cores of each stage and the stator cores of the adjacent stages. The magnet poles of each rotor core are equiangularly spaced from each other and the magnet poles of each stator core are equiangularly spaced from each other. The magnet poles of each rotor core are maintained at a constant distance from the magnet poles of the corresponding pair of stator cores. An annular spacer of magnetic material is coaxially positioned around each stator core excitation winding means between each corresponding pair of stator cores. Additional annular spacers are coaxially positioned around each rotor shaft between each rotor core and each of the corresponding pair of stator cores for maintaining a constant distance between the rotor core and the stator cores. Each pair of stator cores are affixed to each other and the plurality of stages are affixed to each other. A key groove is formed in each of the stator cores and extends in axial direction for keying the stator cores of each of the stages in circumferential position relative to each other. The plurality of stages are housed in a housing and the magnet poles of each rotor core and of each stator core have the same pitch. The additional spacers are of non-magnetic material.

In order that the present invention may be readily carried into effect, it will now be described with reference to the accompanying drawings, wherein:

FIG. 10 is a schematic diagram indicating the relative positions of the magnet poles of the rotors and stators of the polyphase step motor of the present invention.

In the figures, the same components are identified by the same reference numerals.

Figure 1:
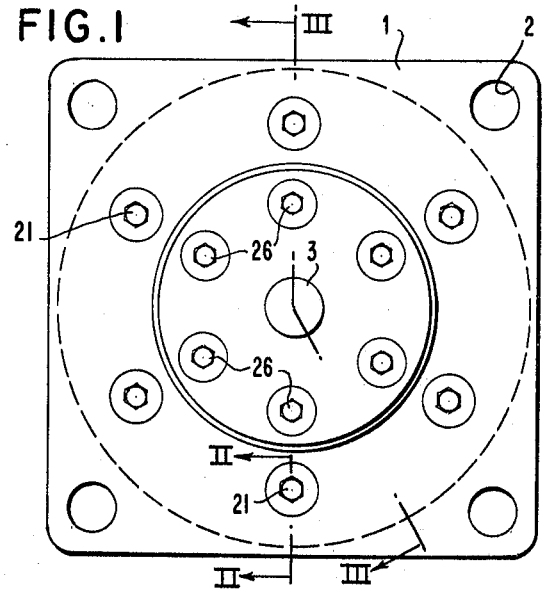
FIG. 1 is an end view of an embodiment of the polyphase step motor of the present invention.

In FIG. 1, a flange 1 is utilized to affix the step motor of the present invention to any suitable supporting structure or machinery. The step motor may be affixed to apparatus such as, for example, a machine tool which is to be driven by said motor. The motor is affixed to the apparatus by holes or apertures 2 formed through the flange 1 at each of its corners. The motor drives an output shaft or motor shaft 3.

Figure 2:
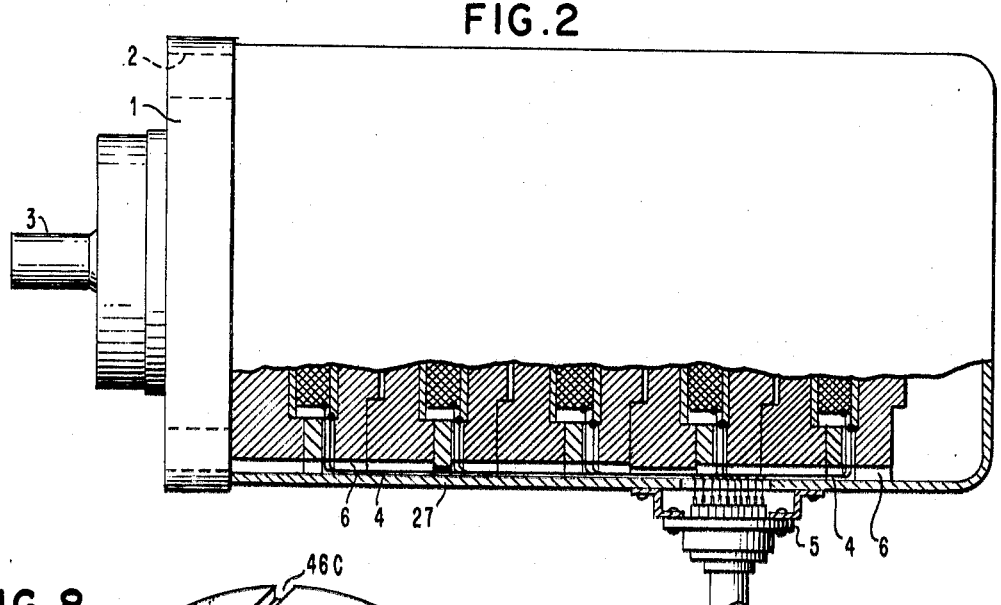
FIG. 2 is a side view, cut away and partly in section, taken along the lines II—II of FIG. 1.

For purposes of illustration, the polyphase step motor of the present invention is assumed to have five stages so that it functions as a five phase motor. In FIG. 2, lead wires 4 from the excitation windings of the stator cores, of which there are five, are connected to a common input terminal 5. The lead wires 4 from the stator core excitation windings pass through grooves or slots 6 formed in the stator cores.

Figure 3:
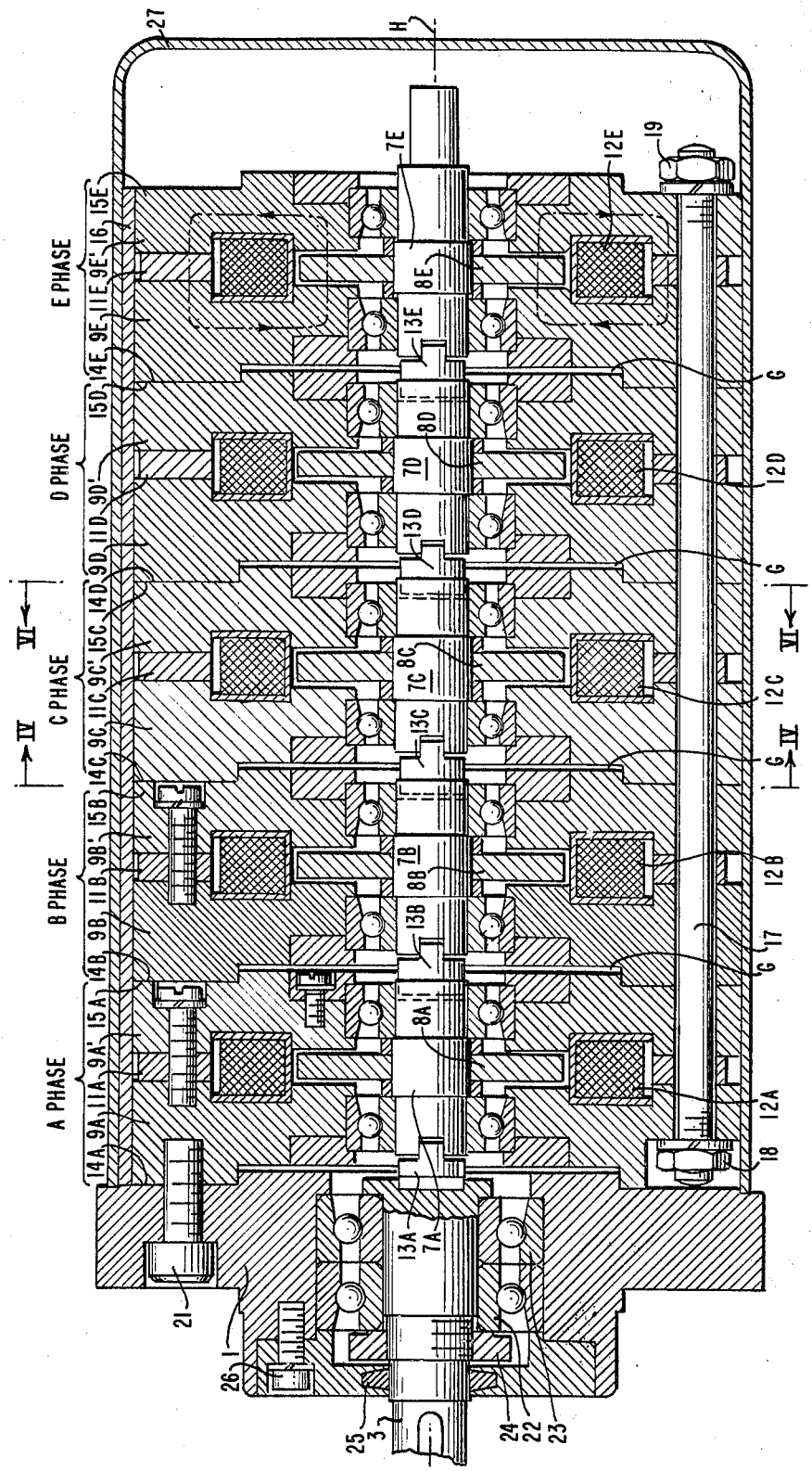
FIG. 3 is a view, partly in section, taken along the lines III—III of FIG. 1.

FIG. 3 discloses the structure of the step motor of the present invention in considerable detail. In FIG. 3, the first stage, and therefore the first phase of the motor is phase A, the second stage, and therefore the second phase is phase B, the third stage and therefore the third phase is phase C, the fourth stage and therefore the fourth phase is phase D and the fifth stage and therefore the fifth phase is phase E. Each of the stages of the motor is assembled independently from the others. Each stage of the motor comprises rotor apparatus and stator apparatus. The rotor apparatus of each stage comprises a rotor shaft 7A, 7B, 7C, 7D and 7E, respectively, and an annular rotor core 8A, 8B, 8C, 8D and 8E, respectively. Each rotor core 8A to 8E is coaxially positioned around and fitted on and affixed to the corresponding rotor shaft 7A to 7E. The rotor cores 8A to 8E are affixed to the corresponding rotor shafts 7A to 7E by any suitable means such as, for example, shrink fitting processes.

The stator apparatus of each stage of the polyphase step motor of the present invention comprises two annular stator cores 9A and 9A', 9B and 9B', 9C and 9C', 9D and 9D' and 9E and 9E', respectively. Each stator core comprises magnetic material coaxially positioned around the corresponding rotor shaft 7A to 7E. The stator apparatus of each stage of the motor includes a spacer 11A, 11B, 11C, 11D and 11E, respectively, comprising magnetic material of substantially annular configuration positioned between the corresponding pair of stator cores 9A and 9A' to 9E and 9E'. Thus, the spacer 11A is positioned between the stator cores 9A and 9A' of the first stage, or phase A, of the motor, the spacer 11B is positioned between the stator cores 9B and 9B' of the second stage, or phase B, of the motor, and so on. The stator apparatus of each stage of the motor includes a stator core excitation winding 12A, 12B, 12C, 12D and 12E, respectively, coaxially positioned around the corresponding rotor shaft 7A to 7E and positioned between the corresponding pair of stator cores 9A and 9A' to 9E and 9E'. Thus, the stator core excitation winding 12A is coaxially positioned around the rotor shaft 7A and is positioned between the pair of stator cores 9A and 9A' in the first stage, or phase A, of the motor, and so on.

The rotor apparatus of the first and second stages, the second and third stages, the third and fourth stages and the fourth and fifth stages are coupled to each other by any suitable means, such as, for example, coupling elements or couplings 13B, 13C, 13D and 13E, respectively. The coupling elements 13A to 13E couple the rotor shafts 7A to 7E of the rotor apparatus and may comprise, for example, Oldham's coupling units. Each coupling may utilize a groove or slot formed in one of the rotor shafts being coupled. The output shaft 3 is coupled to the first rotor shaft 7A via a coupling or coupling element 13A, which is the same as the coupling elements 13B, 13C, 13D and 13E.

The stator apparatus of the different stages of the motor are positioned relative to each other along the common axis H of the rotor shafts 7A, 7B, 7C, 7D and 7E by cooperating recesses and projections of adjacent surfaces of the stator cores. Thus, for example, the flange 1 is positioned relative to the first stator apparatus of phase A via a projection 14A of substantially annular configuration on the surface of the stator core 9A adjacent said flange, the stator apparatus of phases A and B are positioned relative to each other via an annular recess 15A in the surface of the stator core 9A' of phase A and an annular projection 14B on the surface of the stator core 9B of phase B which is adjacent to and cooperates with said recess, and so on.

The stator apparatus of each stage is positioned relative to the others in circumferential or radial directions by a key 16. The five stages of the motor are firmly affixed to each other by any suitable means such as, for example, a plurality of elongated bolts 17 which are passed through apertures formed through the stator cores 9A to 9E of the stages, and nuts 18 and 19 threadedly coupled to each of said bolts at its ends. The flange 1 is firmly affixed to the assembled motor via a plurality of bolts 21 which affix it to the annular stator core 9A of the first stage of said motor. The output shaft 3 of the motor is rotatably supported by bearings 22 and 23. The output shaft 3 and the bearings 22 and 23 are prevented from axial movement relative to each other by a lock nut 24. A coaxially positioned watertight seal 25 is provided around the output shaft 3 and is held in position by a plurality of bolts 26. The five stages of the motor are covered at their output shaft end by the flange 1 and are covered at their opposite end, as well as circumferentially, by a housing 27. The housing 27 may comprise any suitable material. The stator cores 9A and 9A' to 9E and 9E' of the stages are positioned with a small gap G between the stator cores of each stage and the stator cores of the adjacent stages.

In order to describe the invention with maximum clarity, a single stage or phase thereof, which, for purely illustrative purposes is the third stage, phase C or C phase, will be described. The described C phase is essentially identical with the other phases of the motor and is therefore representative of such other phases.

Figure 4:
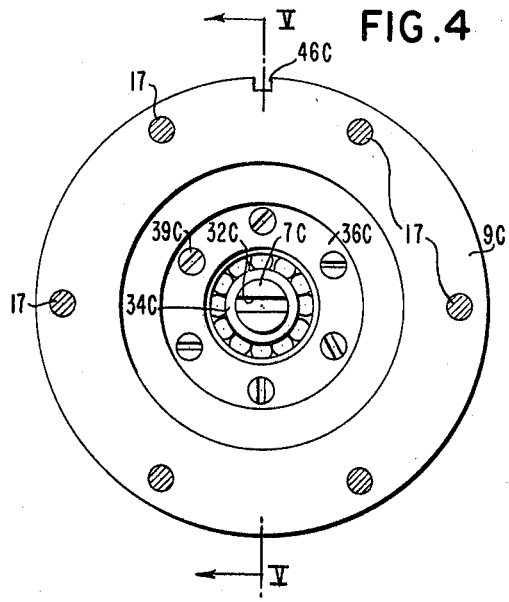
FIG. 4 is an end view, partly in section, taken along the lines IV—IV of FIG. 3.
Figure 5:
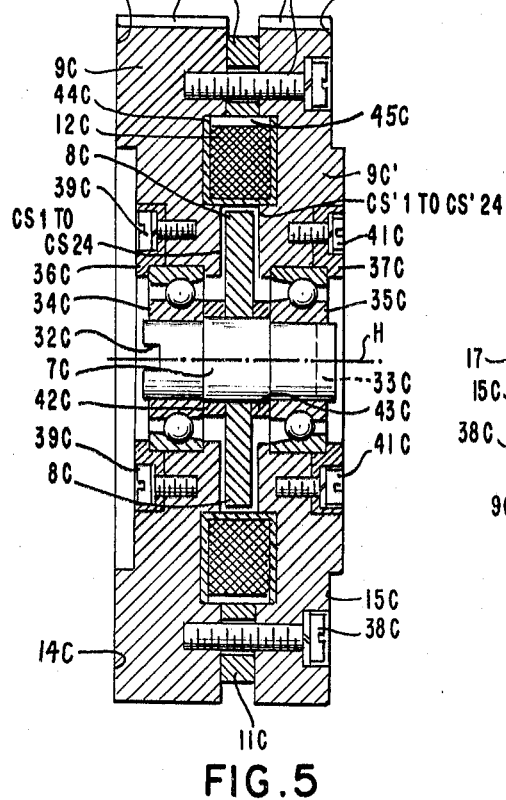
FIG. 5 is a view, partly in section, taken along the lines V—V of FIG. 4.
Figure 6:
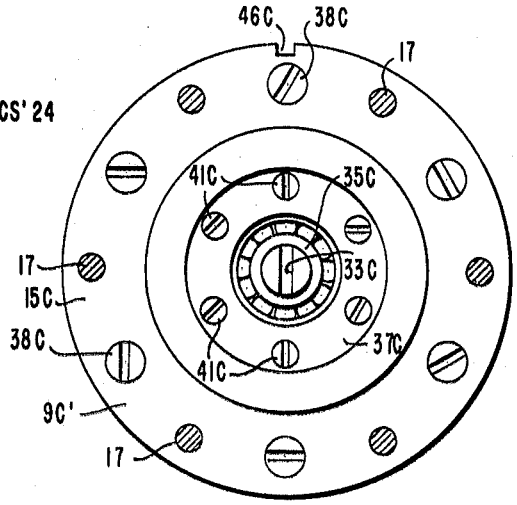
FIG. 6 is a view, partly in section, taken along the lines VI—VI of FIG. 3.

FIG. 4 is an axial view of the third stage or C phase of the motor. In FIGS. 4, 5 and 6, the rotor apparatus comprises a rotor shaft 7C and a coaxially positioned rotor core 8C around said rotor shaft and securely affixed to the outer circumference of said rotor shaft or integrally formed with said rotor shaft. The rotor core 8C has a plurality of radially extending magnet poles formed therein which are equiangularly spaced and are of equal length. The magnet poles are described in detail hereinafter. A first groove or slot 32C is formed in the rotor shaft 7C at one end thereof and extends through the axis H of said shaft. A second groove or slot 33C is formed in the rotor shaft 7C at the other end and extends through the axis H of said shaft. The grooves or slots 32C and 33C are at right angles to each other.

The stator apparatus, as shown in FIGS. 4, 5 and 6, comprises a pair of annular or substantially disc-shaped stator cores 9C and 9C' coaxially positioned around the rotor shaft 7C. The stator cores 9C and 9C' are spaced from and parallel to each other. The stator core 9C and the rotor shaft 7C are rotatably mounted relative to each other via a bearing 34C, and the stator core 9C' and said rotor shaft are rotatably mounted relative to each other via bearing 35C. The bearing 34C is held in axial position by an annular holding plate 36C and the bearing 35C is held in axial position by an annular holding plate 37C.

An annular spacer 11C of magnetic material is coaxially positioned around the rotor shaft 7C between the stator cores 9C and 9C'. A stator core excitation winding 12C is coaxially positioned around the rotor core 8C and within the spacer 11C. The stator cores 9C and 9C' support the annular spacer 11C between them by applying pressure thereto and are affixed to each other by a plurality of equiangularly spaced bolts 38C which pass through apertures formed through said stator cores. The bolts 38C are threadedly coupled with the internally threaded apertures through which they pass. The bolts 38C, of course, also pass through corresponding apertures formed through the spacer 11C. The stator cores 9C and 9C' are thus spaced by a distance determined by the thickness in the axial direction of the spacer 11C.

The holding plates 36C and 37C for the bearings 34C and 35C, respectively, are firmly affixed to their corresponding stator cores 9C and 9C'. The holding plate 36C is affixed to the stator core 9C by a plurality of bolts 39C which are threadedly coupled with internally threaded corresponding apertures formed in said stator core. The holding plate 37C is affixed to the stator core 9C' by a plurality of bolts 41C which are threadedly engaged with internally threaded corresponding apertures formed in said stator core. An annular spacer 42C of nonmagnetic material is coaxially positioned around the rotor shaft 7C, between the rotor core 8C and the bearing 34C, and functions as a spacer between said bearing and said rotor core. An annular spacer 43C of non-magnetic material is coaxially positioned around the rotor shaft 7C, between the rotor core 8C and the bearing 35C, and functions as a spacer between said bearing and said rotor core.

The rotor core 8C has a plurality of radially extending equiangularly positioned magnet poles CR1 to CR24 formed therein. The magnet poles of the rotor core are described in detail with regard to FIG. 7. Each of the stator cores 9C and 9C' has a surface facing the other across the space formed by the spacer 11C. Each of the stator cores 9C and 9C' on its surface facing the other and facing each corresponding side of the rotor core 8C has formed therein a plurality of equiangularly spaced radially extending magnet poles CS1 to CS24 and CS'1 to CS'24, respectively. The magnet poles of each of the stator cores 9C and 9C' are equal in number to and correspond with those of the rotor core. The magnet poles of the stator cores are described in greater detail with reference to FIG. 8.

The annular spacer 11C has an axial thickness which is so determined that the magnet poles CR1 to CR24 of the rotor are in sufficient proximity with the magnet poles CS1 to CS24 and CS'1 to CS'24 of the stator cores 9C and 9C', respectively. The stator core excitation winding 12C is wound on a spool or the like 44C or annular configuration which is coaxially positioned with the rotor shaft 7C and around the rotor core 8C. The spool 44C is positioned in the space 45C between the stator cores 9C and 9C', between the rotor core 8C and the spacer 11C. A key groove 46C is formed in the stator cores 9C and 9C' to enable radial or circumferential positioning of the stages of the motor.

Figure 7:
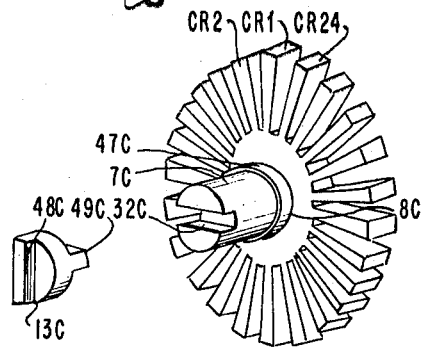
FIG. 7 is a perspective view of a rotor core and its coupling element of the polyphase step motor of the present invention.

FIG. 7 discloses the rotor core 8C of the C stage of the motor in perspective and includes a perspective view of an Oldham coupling unit 13C for the rotor apparatus. There are 24 magnet poles CR1 to CR24 formed in the rotor core 8C. The magnet poles CR1 to CR24 are equiangularly spaced from each other and extend radially from the hub of the rotor core in equal radial lengths, in the aforedescribed manner. The rotor magnet poles CR1 to CR24 are integrally formed with the rotor core 8C, said rotor core comprising magnetic material, and are firmly affixed to the rotor shaft 7C by any suitable means such as, for example, shrink fitting the hub of said rotor core onto said rotor shaft. The rotor shaft 7C usually comprises a non-magnetic material, but if said shaft is of magnetic material, a cylindrical sleeve-type member 47C of non-magnetic material is coaxially positioned around said shaft interposed between said shaft and the hub of the rotor core 8C to prevent the leakage of magentic flux to said shaft. The coupling element 13C is of substantially cylindrical configuration having two substantially parallel base surfaces with a linearly extending projection 48C on one of said surfaces and a linearly extending projection 49C on the other of said surfaces. The projections 48C and 49C are at right angles to each other and engage the corresponding slot in the rotor shaft 7B of the B stage and the slot 32C of the rotor shaft 7C of the C stage.

Figure 8:
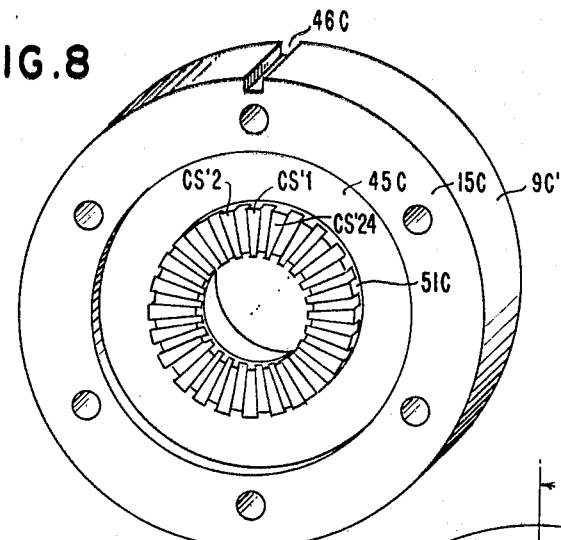
FIG. 8 is a perspective view of a stator core of the polyphase step motor of the present invention.

FIG. 8 is a perspective view of the stator core 9C'. In the aforedescribed manner, stator magnet poles CS'1 to CS'24 are formed in the surface of the stator core 9C' which faces the rotor core 8C and the stator core 9C. The stator magnet poles are equiangularly spaced and extend radially in correspondence with the rotor magnet poles CR1 to CR24. The stator magnet poles CS'1 to CS'24 are formed in an annular projection 51C which is part of the surface of the stator core 9C' facing the rotor magnet poles CR1 to CR24. The corresponding stator magnet poles CS'1 to CS'24, as well as the corresponding stator magnet poles CS1 to CS24 (not shown in the figures), have a constant pitch and have equal circumferential widths. The stator core 9C is identical in configuration with the stator core 9C'.

Figure 9:
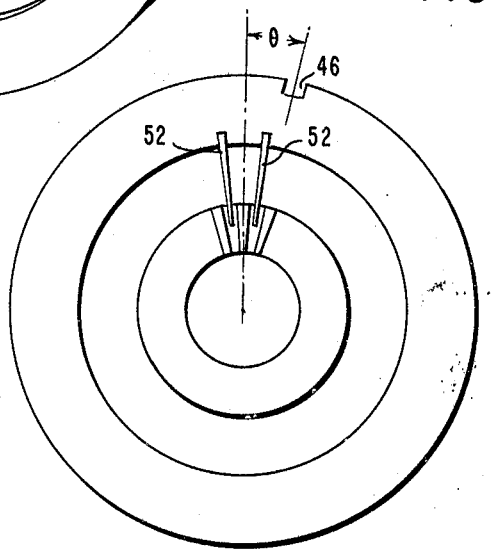
FIG. 9 is a schematic diagram for explaining the positioning of the stator cores of the polyphase step motor of the present invention.

In the polyphase step motor of the present invention, as illustrated in FIG. 9, each stator core is provided with a plurality of radially extending slots 52 formed in its surface. The slots 52 are of sufficient depth to provide an additional reduction in eddy current loss. Since, in the illustrated embodiment of the five phase step motor of the present invention, there are 24 poles, the stator cores 9A and 9A', 9B and 9B', 9C and 9C', and the like, of the various stages of the motor are shifted one fifth in pitch relative to each other. For this reason, as illustrated in FIG. 9, the stator cores of each stage are rotated so that the key grooves or slots 46 such as, for example, the key grooves 46C of the stator cores 9C and 9C' of the C stage, are provided at positions such that the angle $\theta$ between each of said key grooves and a vertical plane through the axis H may be, for example, zero degrees, 3 degrees, 6 degrees, 9 degrees and 12 degrees for the successively positioned pairs of stator cores. This enables the stator cores to be radially or circumferentially positioned relative to each other by a single key 16, as shown in FIG. 3.

FIG. 10 illustrates the relation between the positions of the stator magnet poles and the rotor magnet poles of the five phases constituting the A phase, B phase, C phase, D phase and E phase of the illustrated step motor of the present invention. As indicated in FIG. 10, the magnet poles of the rotor cores of the five phases are axially aligned and the magnet poles of the pairs of stator cores of the five stages are shifted relative to each other by one fifth the pitch of the magnet poles. The condition of the motor indicated in FIG. 10 is one in which current is supplied to and flows in the stator core excitation winding 12A of the A phase. At such time, a magnetic flux of the type disclosed by the broken lines in the E phase of FIG. 3 is produced in the A phase. As illustrated in FIG. 10, the magnet poles AR1 to AR24 of the rotor core 8A are moved to positions adjacent the magnet poles AS1 to AS24 and AS'1 to AS'24 of the stator cores 9A and 9A', respectively. The rotor magnet poles AR1 to AR24 are thus moved to positions directly between the corresponding stator magnet poles AS1 to AS24 and AS'1 to AS'24.

When the current supply to the stator core excitation winding 12A of the A phase is cut off and current is supplied to and flows in the stator core excitation winding 12B of the B phase, the magnet poles BR1 to BR24 of the stator core 8B are moved or driven so that said magnet poles come to positions adjacent and directly between the magnet poles BS1 to BS24 and BS'1 to BS'24 of the stator cores 9B and 9B', respectively, of the B phase. The rotors of the phases A to E are thus rotated step by step by switching the excitation of the stator core excitation windings of the phases in sequence, in the aforedescribed manner.

Since, as hereinbefore described, the magnet poles of the rotor of each stage of the motor are positioned between corresponding magnet poles of the corresponding two stator cores of each stage, and the stator cores are spaced from each other, there is substantially no leakage flux when the stator core excitation winding of the stage is energized. Most of the magnetic flux passes only through places between the magnet poles of the rotor core and the corresponding magnet poles of the corresponding pair of stator cores, and such flux thus functions effectively as an attractive force. Furthermore, the provision of radially extending magnet poles on the rotor core of each phase or stage of the motor permits the axial width of the rotor core to be very small in dimension, thereby permitting the rotor inertia to be very small.

Each stator core may be readily fabricated by providing grooves or changes in an annular projected portion provided on the appropriate surface of the stator core. The appropriate surface of the stator core, as hereinbefore described, is that which faces the corresponding surface of the other stator core of each pair of stator cores, both surfaces facing the corresponding rotor core. The stator apparatus of each stage may be readily and facilely assembled by affixing both stator cores of each stage to each other by bolts or the like.

Our polyphase step motor may be assembled with facility, rapidity and accuracy by assembling each stage or phase independently from the others and then interconnecting the various phases.

While the invention has been described by means of a specific example and in a specific embodiment, we do not wish to be limited thereto, for obvious modifications will occur to those skilled in the art without departing from the spirit and scope of the invention.

We claim:

1. a step motor having a plurality of separately assembled stages, each of which comprises a separate rotor shaft; a rotor core coaxially positioned around and affixed to said rotor shaft and having a plurality of radially extending magnet poles formed therein; a pair of annular stator cores coaxially positioned around said rotor shaft in spaced substantially parallel axial relation one on each side of said rotor core and each having a plurality of magnet poles formed therein on its surface facing the other, the magnet poles of said rotor core and said stator cores corresponding to each other in number; and stator core excitation winding means coaxially positioned around said rotor core in the space between said pair of stator cores.

2. A step motor as claimed in claim 1, wherein the stator cores of said stages are positioned with a small gap between the stator cores of each stage and the stator cores of the adjacent stages.

3. A step motor as claimed in claim 1, wherein the magnet poles of each rotor core are equiangularly spaced from each other and wherein the magnet poles of each stator core are equiangularly spaced from each other.

4. A step motor as claimed in claim 1, further comprising means for maintaining the magnet poles of each rotor core at a constant distance from the magnet poles of the corresponding pair of stator cores.

5. A step motor as claimed in claim 1, further comprising an annular spacer of magnetic material coaxially positioned around each said stator core excitation winding means between each corresponding pair of stator cores.

6. A step motor as claimed in claim 1, further comprising annular spacer means coaxially positioned around each said rotor shaft between each said rotor core and each of the corresponding pair of stator cores for maintaining a constant distance between said rotor core and said stator cores.

7. A step motor as claimed in claim 1, further comprising means for affixing each said pair of stator cores to each other and means for affixing said plurality of stages to each other.

8. A step motor as claimed in claim 1, further comprising a key groove formed in each of said stator cores and extending in axial direction for keying the stator cores of each of said stages in circumferential position relative to each other.

9. A step motor as claimed in claim 1, further comprising housing means housing said plurality of stages, an annular spacer of magnetic material coaxially positioned around each said stator core excitation winding means between each corresponding pair of stator cores and annular spacer means coaxially positioned around each said rotor shaft between each said rotor core and each of the corresponding pair of stator cores for maintaining a constant distance between said rotor core and said stator cores, and wherein the magnet poles of each rotor core are equiangularly spaced from each other, the magnet poles of each stator core are equiangularly spaced from each other, the magnet poles of each rotor core and of each stator core have the same pitch and said spacer means are of non-magnetic material.

10. A step motor as claimed in claim 3, wherein the magnet poles of each rotor core and of each stator core have the same pitch.

11. A step motor as claimed in claim 6, wherein said spacer means are of non-magnetic material.

12. A step motor as claimed in claim 9, further comprising means for affixing each pair of stator cores to each other and means for affixing said plurality of stages to each other and a key groove formed in each of said stator cores and extending in axial direction for keying the stator cores of each of said stages in circumferential position relative to each other.

13. A step motor as claimed in claim 9, wherein the stator cores of said stages are positioned with a small gap between the stator cores of each stage and the stator cores of the adjacent stages.

References Cited

UNITED STATES PATENTS

| | | | |
|---|---|---|---|
| 2,797,346 | 6/1957 | Ranseen | 310—46 |
| 3,005,118 | 10/1961 | Ranseen | 310—49 |
| 3,293,460 | 12/1966 | Iwai et al. | 310—49 |

WARREN E. RAY, Primary Examiner

U.S. Cl. X.R.

310—268